United States Patent

Elmaliach et al.

[19]

[11] Patent Number: 5,847,760
[45] Date of Patent: Dec. 8, 1998

[54] METHOD FOR MANAGING VIDEO BROADCAST

[75] Inventors: Yehuda Elmaliach, Rosh Haayin; Amir Bassan-Eskenazi, Tel Aviv, both of Israel

[73] Assignee: Optibase Ltd., Herzlia, Israel

[21] Appl. No.: 862,051

[22] Filed: May 22, 1997

[51] Int. Cl.⁶ .................................................. H04N 7/26
[52] U.S. Cl. ........................................... 348/390; 348/845
[58] Field of Search ............................ 348/7, 390, 845, 348/419, 411; H04N 7/26

[56] References Cited

U.S. PATENT DOCUMENTS

| | | | |
|---|---|---|---|
| 5,216,503 | 6/1993 | Paik | 348/390 |
| 5,367,334 | 11/1994 | Nishino | 348/390 |
| 5,467,132 | 11/1995 | Fazel | 348/390 |
| 5,629,736 | 5/1997 | Haskell | 348/390 |
| 5,661,523 | 8/1997 | Yamane | 348/390 |

*Primary Examiner*—Howard W. Britton
*Attorney, Agent, or Firm*—Kenyon & Kenyon

[57] ABSTRACT

The present invention provides a method and a system which provide a plurality of compressed presentations for each frame of the original video signal, each presentation provided according to a different bit-rate, wherein the transmitting system selects from the compressed presentations a presentation, which is most suitable for the bit-rate, currently available over the transmission line and transmits it.

3 Claims, 3 Drawing Sheets

METHOD FOR MANAGING VIDEO BROADCAST

FIELD OF THE INVENTION

The present invention relates to a method for managing digital video broadcasts in general and to a method for managing variable bandwidth broadcasts in particular.

BACKGROUND OF THE INVENTION

Methods for transmitting digital video broadcasts over a variable bandwidth transmission line are known in the art. A constant frame rate is essential for real time broadcasting. The frame rate is determined according to the video broadcast standard used. For example, PAL video broadcast method determines twenty-five frames per second while NTSC determines thirty frames per second. Variable bandwidth transmission lines, such as frame relay, are able to carry varying quantities of information at different times, thus providing a variable, non-predicted bit-rate.

It will be appreciated by those skilled in the art that the actual bit-rate cannot be foreseen. According to conventional methods, each of the frames of the original video signal is processed into a frame file which includes low-resolution information as well as high-resolution information. A broadcast controller manages the bit-rate according to the bandwidth available. When the transmission line provides a narrow bandwidth, then the controller transmits the low-resolution information for each frame file. When the transmission line provides a wide bandwidth, the controller transmits the low-resolution information as well as the high-resolution information for each frame file. Thus, depending on the bandwidth, the controller will transmit various portions of the frame file.

Wavelets is a method in which each frame is compressed into a file which provides producing a scaleable evolving representation of a frame, in which the rough elements data is decoded first and the fine details data is decoded last. Thus, at a high bit-rate most of the compressed frame can be transmitted, providing a fine detail picture while, at a low bit-rate only the rough elements data is transmitted, providing a rough detail picture.

It will be appreciated that, in real time, it is very difficult to process an MPEG file, so as to extract various portions of the original frames, and transmit them according to the available bit-rate.

When using a variable bandwidth communication link, an MPEG file has to be downloaded first into the receiving station, before being displayed. In real time broadcasting, the bandwidth provided by the transmission line has to be greater or equal to the bit-rate value required and characterizing the MPEG stream. If, at a certain point in time, the transmission line bandwidth becomes narrow in a sense that it drops below the bit-rate value required and characterizing the MPEG stream, then, the recipient station does not receive all of the data required to decode the MPEG stream and produce a smooth presentation of the video signal.

SUMMARY OF THE PRESENT INVENTION

It is an object of the present invention to provide a novel method for providing and managing a real time, variable band-width video broadcast.

In accordance with the present invention there is thus provided a method for providing and managing a real time, variable bit-rate, compressed video broadcast signal to be transmitted over a variable bit-rate transmission line. The transmission line is characterized by a bit-rate range, having a maximal bit-rate value and a minimal bit-rate value. The method including the steps of:

A. converting a video signal into a group of at least two compressed frame-sets, each the frame-set compressed according to a different bit-rate value, the bit-rate values being no greater than the maximal bit-rate value, each the compressed frame-set including the same group of pictures (GOP) arrangement;

B. detecting the available bit-rate value, currently available over the transmission line;

C. selecting one of the compressed frame-sets, wherein the bit-rate value of the selected compressed frame-set is not higher than the available bit-rate value;

D. selecting a GOP of the selected compressed frame-set as output; and

E. repeating the steps B–D in order to select the next GOP.

The method of the invention may also include a step of transmitting the GOP over the transmission line.

In accordance with another aspect of the present invention there is provided a system for providing and managing a real time, variable bit-rate, compressed video broadcast signal, the system being connected on input to a video source and on output to a transmitter which is further connected to a variable bit-rate transmission line, the transmission line being characterized by a maximal bit-rate value and a minimal bit-rate value, the system including:

a video encoder, connected to the video source, for compressing a video signal received from the video source into at least two compressed frame-sets, each the frame-set being compressed according to a different bit-rate value; and a controller connected to the video encoder and to the transmitter, for receiving an available bit-rate value from the transmitter, for selecting one of the compressed frame-sets, for selecting a group of frames (GOP) from the selected compressed frame-set and for providing the selected GOP to the transmitter, wherein the bit-rate value of the selected compressed frame-set is not greater than the available bit-rate value.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The method of the present invention overcomes the disadvantages of the prior art by providing a plurality of MPEG presentations for each frame of the original video signal. Each of the MPEG presentations is provided according to a different bit-rate.

When transmitting, the transmitting system selects from the MPEG presentations a presentation, which is most suitable for the available bit-rate and transmits it. The transmitting system does not have to rebuild a broadcast file every time that the bit-rate changes. Instead, it selects from already prepared files the most suitable one.

Methods for analyzing and compressing a digital video signal, as well as decompressing the compressed digital code, are known in the art. According to a family of standards, known as Motion Picture Expert Group (MPEG) such as ISO/IEC 11172 (MPEG-1) and ISO/IEC 13818 (MPEG-2), is each frame or field of the original video signal, can be compressed into three main types of pictures. It is noted that a picture in MPEG can be either a video frame or a video field. A first type is an Intra-decoded picture (I-frame) which contains all of the information needed to produce a single original picture. A second type is a Predictive picture (P-frame) which includes information for producing an original video frame, based on a previous reference frame. A reference frame is an adjacent I-frame or P-frame. The size of a P-frame is typically smaller than the size of an I-frame. A third type is a Bi-directional predictive (B-frame) which includes information for producing an original video frame, based on either the previous reference frame, the next reference frame or both. The size of a B-frame is typically smaller than the size of a P-frame.

Normally, frames are organized in a Group Of Pictures (GOP) which includes a sequence of P-frames, B-frames and at least one I-frame.

Figure 1:
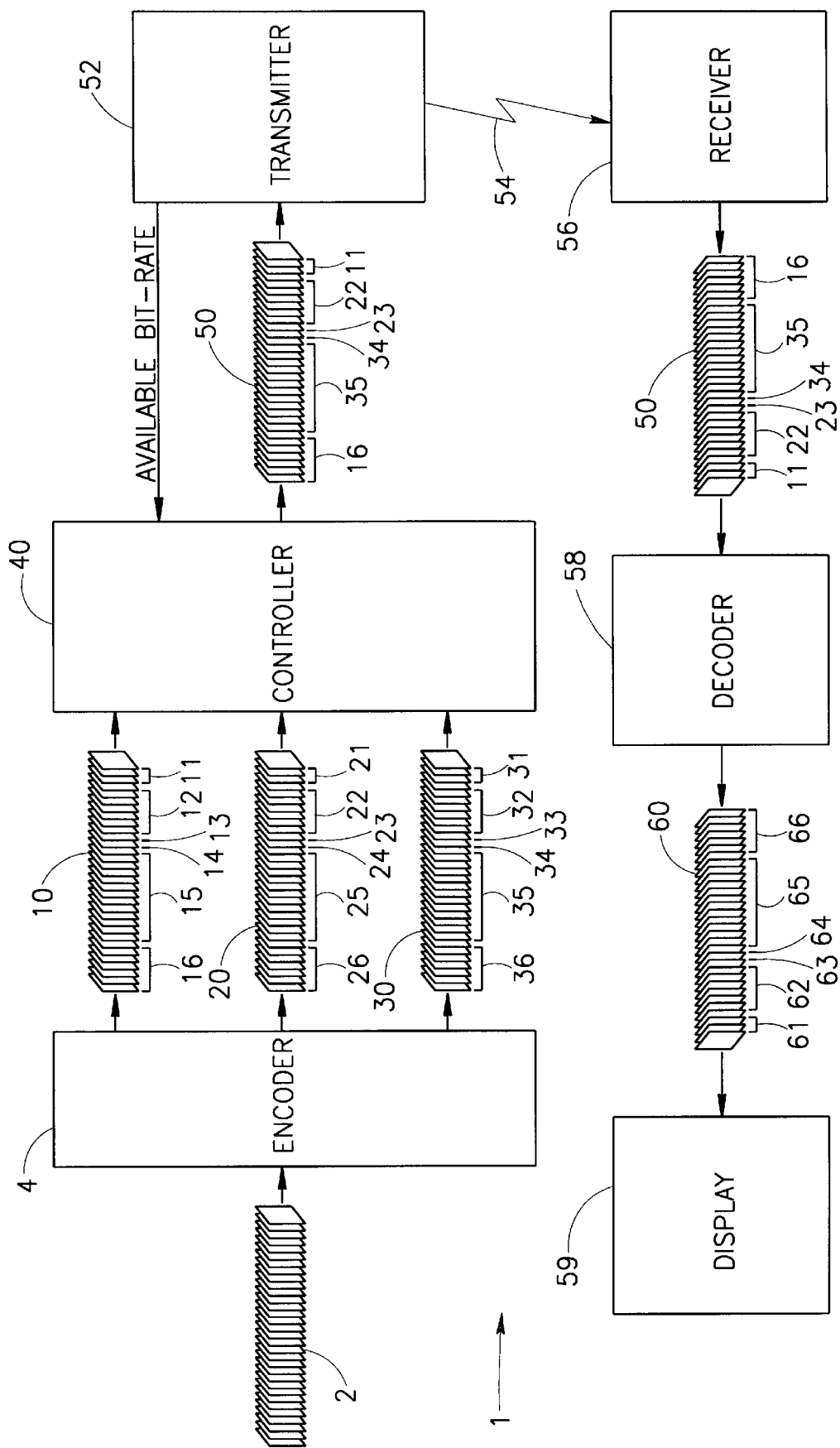
FIG. 1 is a schematic illustrating of an MPEG variable bandwidth transmitting system, constructed and operative according to a preferred embodiment of the present invention.

Reference is now made to FIG. 1 which is a schematic illustration of an MPEG variable bandwidth transmitting system, generally referenced 1, constructed and operative according to a preferred embodiment of the present invention.

System 1 includes an encoder 4, a controller 40, a transmitter 52, a receiver 56, a decoder 58 and a display 59. The controller 40 is connected to encoder 4 and to transmitter 52. The decoder 58 is connected to the receiver 56 and to the display 59. The transmitter 52 is connected to the receiver 56 via a communication connection 54 which is characterized by a variable, inconsistent bandwidth.

Communication connection 54 can be a wired connection, such as a point to point connection, a frame relay connection which is available on networks such as the Internet, a wireless communication connection and the like.

In the present example, frame-set 2 is an original video signal which can be provided either in an analogue form or in a digital form, by a video camera or another video source such as a VCR, a laser disk device, and the like.

Encoder 4 processes frame set 2 and converts it into three MPEG frame sets 10, 20 and 30.

The encoder 4 provides MPEG frame-set 10 according to the maximal bit-rate which is available. Frame-set 10 includes a plurality of groups of frames (GOPs) 11, 12, 13, 14, 15 and 16. GOP 11 includes 3 frames, GOP 12 includes 7 frames, GOPs 13 and 14 include a single frame each, GOP 15 includes 13 frames and GOP 16 includes 7 frames.

The encoder 4 provides MPEG frame-set 20 according to half the maximal bit-rate which is available. Frame-set 20 includes a plurality of groups of frames (GOPs) 21, 22, 23, 24, 25 and 26. GOP 21 includes 3 frames, GOP 22 includes 7 frames, GOPs 23 and 24 include a single frame each, GOP 25 includes 13 frames and GOP 26 includes 7 frames.

The encoder 4 provides MPEG frame-set 30 according to a quarter of the maximal bit-rate which is available. Frame-set 30 includes a plurality of groups of frames (GOPs) 31, 32, 33, 34, 35 and 36. GOP 31 includes 3 frames, GOP 32 includes 7 frames, GOPs 33 and 34 include a single frame each, GOP 35 includes 13 frames and GOP 36 includes 7 frames.

According to one aspect of the invention, one of the frame-sets is generated first, determining a GOP arrangement. Then, one by one, the rest of the frame-sets are generated, according to the already determined GOP arrangement. It will be noted that the total encoding time period, required to encode all of these frame-sets, generally equals N×T, where N is the number of frame-sets and T is the time required to generate the first frame-set.

Figure 2:
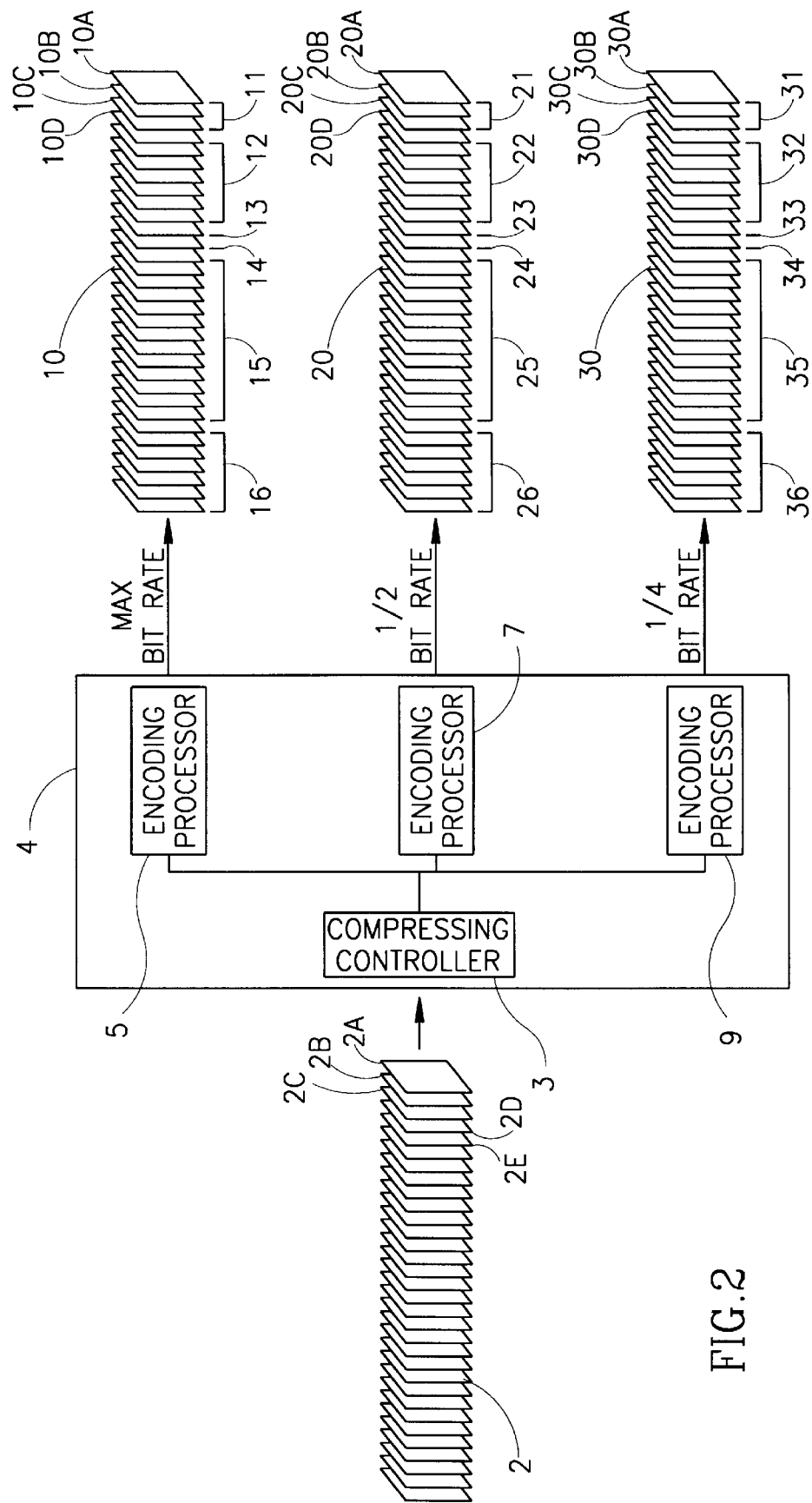
FIG. 2 is a schematic illustrating in detail of the encoding section of FIG. 1.

Reference is now made to FIG. 2 which is a schematic illustrating in detail the encoding section of FIG. 1.

According to the present invention, encoder 4 includes a compressing controller 3 and three encoding processors 5, 7 and 9, connected thereto. The compressing controller 3 receives frame set 2, processes them according to conventional MPEG encoding analysis algorithms and determines at least one command sequence which defines an MPEG compression GOP arrangement, which in general determines the number of frames in a given GOP.

The compressing controller 3 provides the video signal frame-set 2 and the command sequence to the encoding processors 5, 7 and 9. Encoding processor 5 generates frame-set 10 according to the maximal bit-rate, encoding processor 7 generates frame-set 20, according to half the maximal bit-rate and encoding processor 9 generates frame-set 30, according to a quarter of the maximal bit-rate.

The three encoding processors 5, 7 and 9 operate at the same time, providing multi-tasking capability to encoder 4. This aspect of the invention provides a reduced total encoding time period. Instead of encoding the frame-sets, one after the other, they are encoded at the same time, wherein each of them is coordinated so as to include the same GOP arrangement. It will be noted that the first few GOPs of these frame-sets are ready to be selected and transmitted immediately, as they are generated, even before compressing controller 3 has finished processing frame-set 2.

This can be used also for real time implementation. For example, connecting a video camera to a plurality of remote recipient stations, each connected to the camera via a different variable bandwidth communication line. At any given moment, each of the recipient stations is provided with a GOP from a frame-set selected to correspond to the current available bandwidth of the communication line connected thereto.

It will be appreciated that in non real-time implementations of the invention, using a single encoder, one frame-set can be generated primarily, while the rest of the frame-sets are generated afterwards, according to the GOP arrangement of the first frame-set.

GOP 11 corresponds to GOPs 21 and 31. MPEG Frames 10A, 20A and 30A are each a compressed representation of original frame 2A. MPEG Frames 10B, 20B and 30B are each a compressed representation of original frame 2B. MPEG Frames 10C, 20C and 30C are each a compressed representation of original frame 2C.

GOPs 11, 21 and 31 are interchangeable in the sense that each of them includes a compressed representation of the same original frames. The difference between these GOPs is that the volume size of GOP 21 is half the volume size of GOP 11 and twice the volume size of GOP 31. Thus, reproduced video frames, decoded from GOP 21 are less detailed than reproduced video frames, decoded than GOP 11 and more detailed from reproduced video frames, decoded from GOP 31.

In the same manner, GOPs 12, 13, 14, 15 and 16 are respectively interchangeable with either GOPs 22, 23, 24, 25 and 26, or with GOPs 32, 33, 34, 35 and 36.

According to the present invention, the basic independent element in MPEG is a closed GOP, which is a GOP that can be decoded without any information from other GOPs. Therefore, the internal frame arrangement of interchangeable GOPs can be different. For example, GOP 16 may include an I-frame, two P-frames and four B-frames while GOP 26 may include two I-frames and 5 B-frames.

Referring back to FIG. 1, transmitter 52 detects the bandwidth value available on communication connection 54, in real time, and provides it, or the corresponding bit-rate, to controller 40.

Controller 40 selects GOPs from one of the MPEG frame-sets 10, 20 and 30, according to the available bit-rate and forms frame-set 50. If the bit-rate available is the maximal bit-rate, then the controller 40 selects GOPs from frame-set 10. If the bit-rate available is less than the maximal bit-rate, but is at least half the maximal bit-rate, then the controller 40 selects GOPs from frame-set 20. When the bit-rate drops beneath half the maximal bit-rate, the controller 40 selects from the GOP 30.

The controller 40 provides frame-set 50 to transmitter 52 which, in turn, transmits it to receiver 56, via the communication connection 54. Receiver 56 provides frame-set 50 to decoder 58 which, in turn, processes and decodes it into a video signal 60 wherein frame sub-sets 61, 62, 63, 64, 65 and 66 are video representation of GOPs 11, 22, 23, 34, 35 and 16. Then, decoder 58 provides frame-set 60 to display 59 which produces a visual representation of frame-set 60.

Frame sub-sets 61 and 66 include video frames which are originated from GOPs 11 and 16, respectively. Since GOPs 11 and 16 were compressed according to the maximal bit-rate, frame sub-sets 61 and 66 include detailed, high quality, high video resolution video frames.

Frame sub-sets 62 and 63 include video frames which are originated from GOPs 22 and 23, respectively. Since GOPs 22 and 23 were compressed according to half the maximal bit-rate, frame sub-sets 62 and 63 include, medium quality, medium video resolution video frames, generally with fewer details than the frames of frame sub-sets 61 and 66.

Frame sub-sets 64 and 65 include video frames which are originated from GOPs 34 and 35, respectively. GOPs 34 and 35 were compressed according to a quarter the maximal bit-rate, which in the present example is the minimal bit-rate provided by the communication connection 54. Hence, frame sub-sets 63 and 65 include, low quality, low detail frames, generally with fewer details than the frames of frame sub-sets 62 and 63.

According to the present invention, the controller is able to provide a suitable GOP, in real time, as long as the time period between two consecutive bit-rate changes is longer than the time period of the GOP.

According to the present invention, the basic independent element in MPEG is a closed GOP, which is a GOP that can be decoded without any information from other GOPs. According to the present invention, the controller is able to select GOPs from MPEG frame-sets 10, 20 and 30. Thus, the controller 40 can adapt frame-set 50 to the changing bit-rate by selecting the suitable GOP only after a time period which is determined by a previously selected GOP.

As mentioned hereinabove, the time period of a selected GOP is determined according to the number of frames contained in the GOP and the broadcast standard used. Thus, for example, an NTSC GOP including 15 frames, determines a time period of half a second.

It is noted that in the present example, GOPs 13, 14, 23, 24, 33 and 34 are single frame GOPs which, therefore, each include, an I-frame. According to the present invention, the encoder 4 is able to provide MPEG frame-sets which include I-frames only. This arrangement enables the controller to provide a suitable adaptation to the changing bit-rate very quickly, within a time period determined for a single frame.

Figure 3:
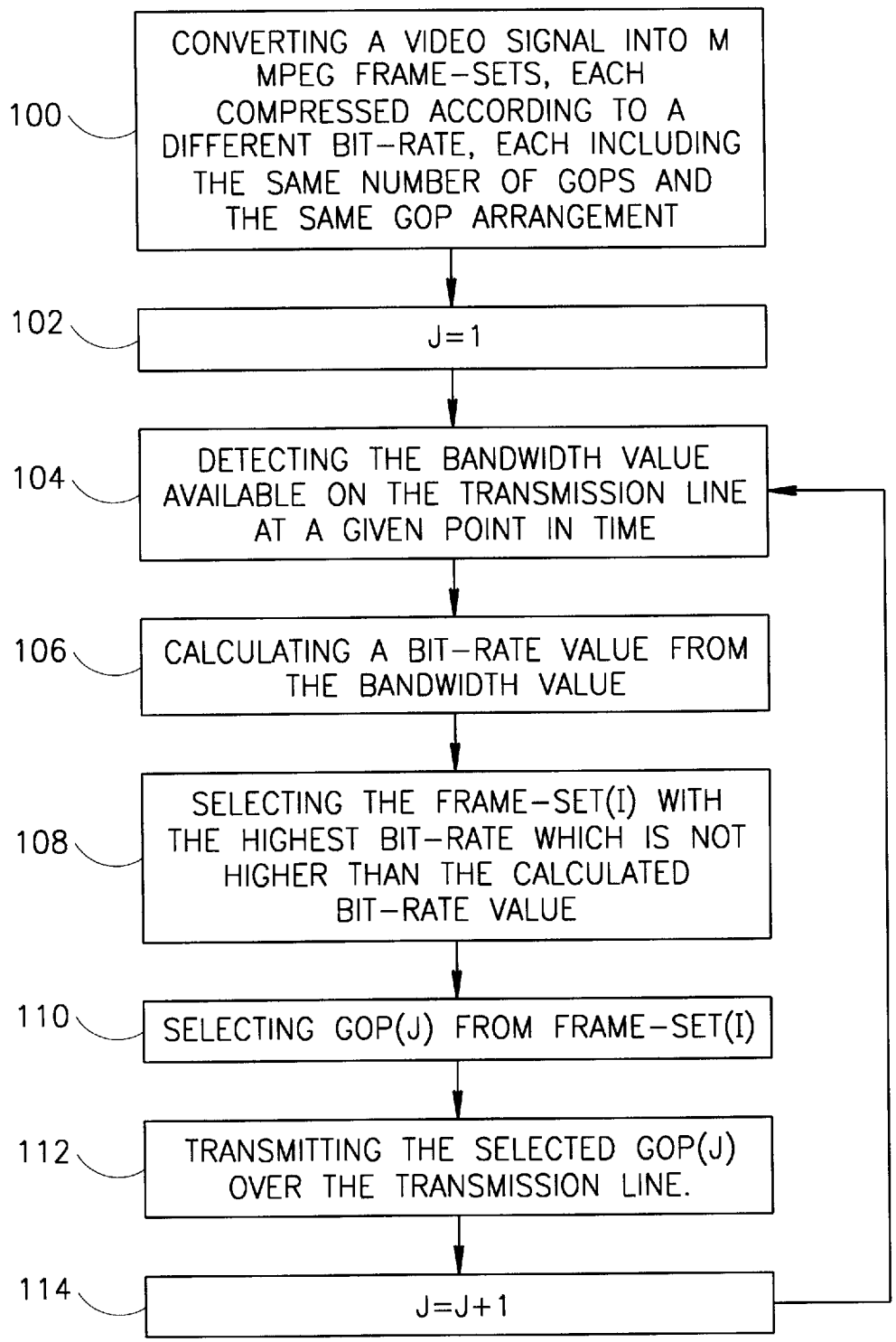
FIG. 3 is a schematic illustrating of a method for real-time broadcasting over a variable bandwidth transmission line, operative according to another embodiment of the present invention.

Reference is now made to FIG. 3 which is a schematic illustrating a method for real-time broadcasting over a variable bandwidth transmission line, operative according to another embodiment of the present invention.

The method of the invention maintains a constant frame rate over a variable bandwidth transmission link, such as frame relay and the like which is characterized by a maximal bit-rate value and minimal bit-rate value. In the present example, the maximal bit-rate value available is 1 Mega bit per second (bps) and the minimal bit-rate value is 10 Kilo bps.

In step 100, a video signal is converted and compressed into a group of at least two MPEG frame-sets. One of the frame-sets is compressed according to the maximal bit-rate value and another frame-set is compressed according to the minimal bit-rate value. The rest of the frame-sets are compressed according to different bit-rate values, which are higher than the minimal bit-rate value and lower than the maximal bit-rate value. Each of the frame-sets includes the same GOP arrangement whereas a selected GOP of one of the frame-sets includes the same number of frames as the respective GOP of another frame-set. Thus, the GOPs are interchangeable in time. According to the present example, each of the frame-sets includes N GOPS. In the present example, five frame-sets are generated, according to the following compression bit-rate values:

| frame-set No. | bit-rate compression value |
| --- | --- |
| 1 | 1 mbps |
| 2 | 500 kbps |
| 3 | 200 kbps |
| 4 | 50 kbps |
| 5 | 10 kbps |

In step 102, J is set to be 1.

In step 104, the bandwidth value, currently available on the transmission line is detected. It will be noted that conventional communication systems, constantly detect the bandwidth value and provide either it or the corresponding bit-rate value. The bandwidth value may change constantly due to the quality of the transmission line, the number of users currently sharing and communicating over it, and the like.

In step 106, the actual bit-rate available is calculated from the bandwidth value.

In step 108, a frame-set is selected from the group according to the available bit-rate. The bit-rate of the selected frame-set is the highest bit-rate which is not higher than the calculated bit-rate value. For example if the available bit-rate is 700 kbps, then frame-set no. 2 is selected and if the available bit-rate is 82 kbps, then frame-set no. 4 is selected.

In step 110, a GOP(J) is selected from the selected frame-set.

In step 112, the selected GOP(J) is transmitted over the transmission line.

In step 114, J is progressed by 1.

Then, steps 104 to 114 are repeated, until J reaches the number of GOPs included in a frame-set.

It will be noted that the invention is applicable to motion JPEG as well as other digital broadcasting techniques.

It will be appreciated by persons skilled in the art that the present invention is not limited to what has been particularly shown and described hereinabove. Rather the scope of the present invention is defined only by the claims which follow.

We claim:

1. A method for providing and managing a real time, variable bit-rate, compressed video broadcast signal to be transmitted over a variable bit-rate transmission line, the transmission line being characterized by a maximal bit-rate value and a minimal bit-rate value, the method comprising the steps of:

A. converting a video signal into a group of at least two compressed frame-sets, each said frame-set compressed according to a different bit-rate value, said bit-rate values being no greater than said maximal bit-rate value, each said compressed frame-set including the same group of pictures (GOP) arrangement;

B. detecting the available bit-rate value, currently available over said transmission line;

C. selecting one of said compressed frame-sets, wherein said bit-rate value of said selected compressed frame-set is not higher than said available bit-rate value;

D. selecting a GOP of said selected compressed frame-set as output; and

E. repeating said steps B–D in order to select the next GOP.

2. The method according to claim 1 further comprising the step of transmitting said GOP over said transmission line.

3. A system for providing and managing a real time, variable bit-rate, compressed video broadcast signal, the system being connected on input to a video source and on output to a transmitter which is further connected to a variable bit-rate transmission line, the transmission line being characterized by a maximal bit-rate value and a minimal bit-rate value, the system comprising:

a video encoder connected to said video source for compressing a video signal received from said video source into at least two compressed frame-sets, each said frame-set being compressed according to a different bit-rate value; and a controller connected to said video encoder and to said transmitter, for receiving an available bit-rate value from said transmitter, for selecting one of said compressed frame-sets, for selecting a group of frames (GOP) from said selected compressed frame-set and for providing said selected GOP to said transmitter, wherein the bit-rate value of said selected compressed frame-set is not greater than said available bit-rate value.

* * * * *

UNITED STATES PATENT AND TRADEMARK OFFICE
CERTIFICATE OF CORRECTION

PATENT NO. : 5,847,760

DATED : December 8, 1998

INVENTOR(S) : Yehuda Elmaliach and Amir Bassan-Eskenazi

It is certified that error appears in the above-identified patent and that said Letters Patent is hereby corrected as shown below:

Column 4, line 66, "from" should be --than--; and

Column 5, line 49, "63 and 65" should be --64 and 65--.

Signed and Sealed this

Fourteenth Day of September, 1999

Attest:

Q. TODD DICKINSON

*Attesting Officer*     *Acting Commissioner of Patents and Trademarks*